Patented June 7, 1932

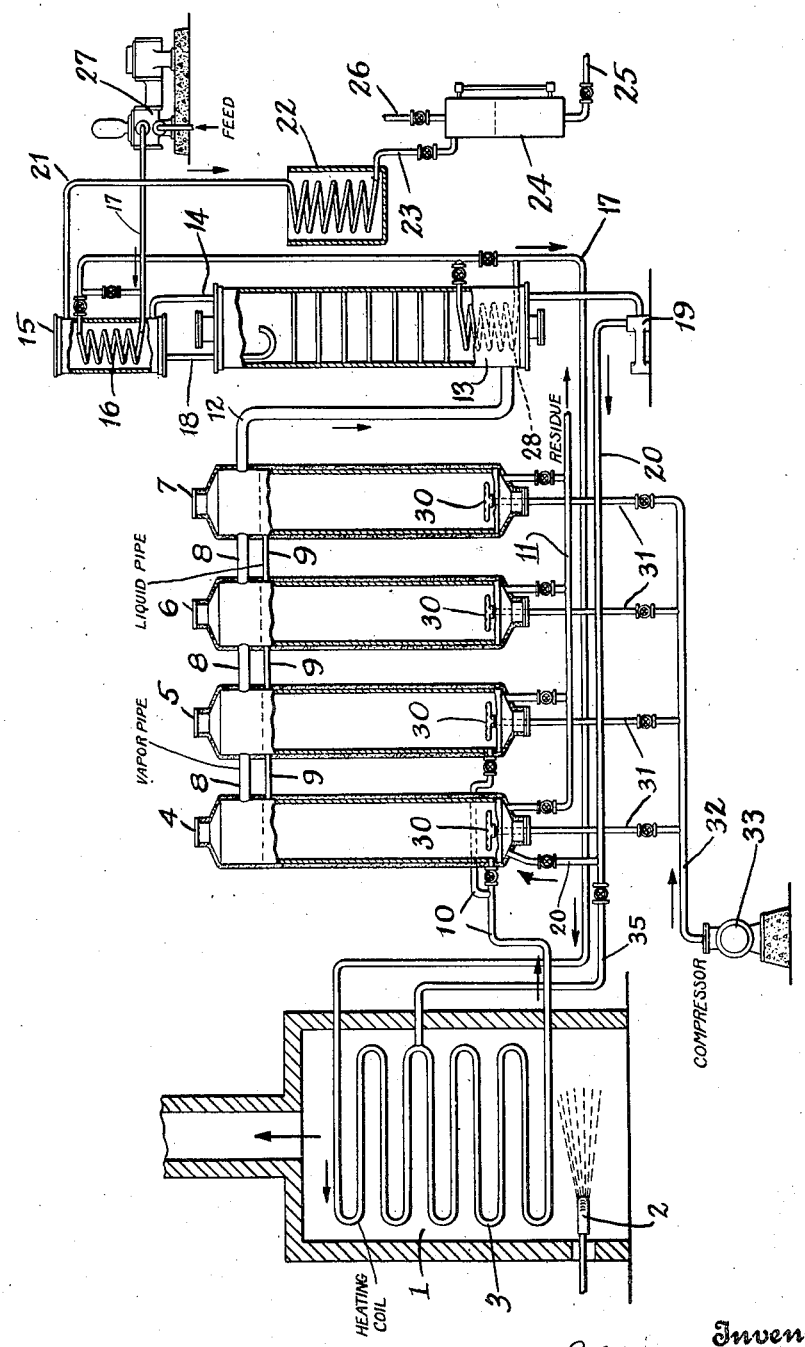

1,861,956

UNITED STATES PATENT OFFICE

RICHARD J. DEARBORN, OF SUMMIT, NEW JERSEY, AND GEORGE W. GRAY, OF NEW YORK, N. Y., ASSIGNORS, BY MESNE ASSIGNMENTS, TO THE TEXAS COMPANY, OF NEW YORK, N. Y., A CORPORATION OF DELAWARE

PROCESS FOR DECOMPOSING ORGANIC MATERIALS

Application filed April 20, 1926. Serial No. 103,252.

This invention relates to a method for decomposing organic substances, preferably in a liquid or semi-liquid state, or in a state of colloidal solution or suspension in a reactive liquid medium, by the application of heat and pressure, and with the aid of an oxidizing gas, preferably air. The invention also contemplates the introduction of air into the body of the liquid medium, preferably in such limited and regulated quantities as to effect the splitting or oxidation or decomposition of the organic substance in a predetermined manner, such splitting or oxidation or decomposition being accomplished preferably without excess of air but, on the contrary, with an excess of the organic material.

The invention is adapted to the treatment of numerous organic substances such as oils, bitumens, tars and pitches, but it is particularly suited to the treatment of hydrocarbons, notably those included in, or derived from mineral oils, crude petroleum, shale oil, mineral waxes, etc. A further adaptation of our invention comprises the treatment of colloidal solutions, or physical suspensions of solid organic material, such as coal, lignite, or peat, preferably in a finely divided condition, in any of the aforementioned liquid substances.

In the operation of this invention a substantial portion of the resultant products may consist of motor fuel of high volatility and especially suitable for use in internal combustion engines, but the process also enables the production of varying proportions of oxygen-containing compounds such as alcohols, aldehydes, ketones, fatty acids, phenoloid bodies and solvents. The proportion of these substances may be varied, depending upon the pressure, temperature, quantity of air and other controllable factors. The products of the decomposition may further be classified as water soluble and water insoluble; the water soluble portion includes such bodies as alcohols, ketones and the like, and the water insoluble portion includes the aforementioned fraction which is especially suitable as motor fuel. Depending upon the character of materials desired or the type of organic substance which is being decomposed, the quantity of air or other controlling factors may be varied.

An outstanding characteristic of the invention consists in the slow oxidation of a portion of the organic substance being treated whereby heat is generated which may be utilized in any measure desired to maintain the temperatures necessary to effect decomposition. In the usual course the oil or liquid medium may be preliminarily heated to such a temperature that the oxygen of the air which may be introduced will readily combine with some of the organic material to generate additional heat. The process may thereafter be conducted merely by maintaining pressure and introducing such a quantity of air as to furnish sufficient heat by oxidation to maintain conditions favorable to decomposition. The process may thus be operated continuously, liquid being added to the reaction chamber to maintain the desired level, while the residuum material or tar may be withdrawn at stated intervals, or continuously. If it is desired the air may be preheated to any suitable degree, with or without preheating of the liquid material.

Our invention further contemplates continuously heating all or a portion of the charge to such temperature that a smaller quantity of air will be required to maintain conditions requisite to decomposition; such quantity of air may constitute only a small fraction of that which would be required if the process were to be operated solely by the heat produced by the exothermic reaction.

In the operation of the usual pyrogenic cracking processes great qauntities of gases are generated and evolved, consisting largely of the lower members of the parffin, olefine and diolefine series of hydrocarbons which constitute the so-called permanent gases, inasmuch as they remain in gaseous form under atmospheric conditions of temperature and pressure. Consequently, these gases are unsuitable for marketing as liquid fuel and special provisions are required to effect their purification and disposal, the customary procedure being to use them as industrial fuel in the refinery. In the generation of the gases, however, there is consumed a considerable quantity of the raw material which is being subjected to decomposition and this action therefore constitutes a costly but necessary part of the cracking operation.

As heretofore pointed out, our process enables the production of controllable quantities of oxygen containing compounds suitable alike for motor fuel, solvents, chemical synthesis, etc. and having valuable properties of commercal aspects and therefore readily marketable at substantial prices in the trade. This process in which the material undergoing decomposition is subjected to oxidation may be distinguished from the commonly known processes of pyrogenic decomposition, cracking, or destructive distillation by the fact that the vapors contain considerably less of fixed or permanent gaseous hydrocarbons, or these vapors may be entirely free from such hydrocarbons. To readily designate a process of this character, therefore, we desire to employ the term oxygenic decomposition, signifying disintegration or decomposition of the organic materials into relatively low boiling liquids in the presence of an oxidizing substance, preferably compressed air.

The process may produce, by one method of operation, vapors containing practically no fixed or permanent gaseous hydrocarbons. Another manner of operation may result in the evolution of only limited amounts of such hydrocarbons, which amounts, however, may be less than those customarily produced in processes of pyrogenic decomposition or cracking.

In one of its aspects this invention may be regarded as a combination of a common method of pyrogenic decomposition, or destructive distillation under pressure, employed in obtaining light hydrocarbon oils from heavier oils, with the broad method of securing low volatile fuels suitable for internal combustion engines, which is characterized by the fact that slow combustion, induced by the introduction of an oxidizing gas into the oil, is relied upon to furnish the heat necessary to effect decomposition. Stated otherwise, a desirable method of operation may be to supply a strictly limited amount of oxidizing gas to material under pressure and undergoing decomposition so that the splitting or decomposition may be effected to all intents by the oxidizing gas and so that there may result no substantial amount of the so-called fixed hydrocarbon gases; the remainder of the heat, necessary to promote active decomposition and amounting to a substantial portion of the whole, may then be furnished by outside means as customarily employed in heat and pressure cracking operations. In this method of operation, the amount of air or other oxidizing gas supplied is limited to the amount required merely to effect decomposition or splitting by oxidation, thus preventing the formation of substantial amounts of fixed hydrocarbon gases characteristic of ordinary cracking or pyrogenic decomposition processes.

In the use of this particular combined method of operation there may be derived economies and advantages which are characteristic of the two methods when independently employed; for instance, the known economies of heat transfer inherent in certain pyrogenic cracking processes may thus be combined with the process of decomposition by oxidation to effectively produce high volatile fuels suitable for internal combustion engines and having a high anti-detonating effect, while at the same time oxidized products of especial value in industry and the arts are produced under conditions unfavorable to the formation of substantial amounts of the so-called fixed or permanent hydrocarbon gases.

In a further aspect of this invention, the liquid may be preheated to the full temperature necessary to effect pyrogenic decomposition or cracking, and then be passed into the reaction chamber where cracking may take place. Such losses of heat as may occur through radiation and in the decomposition and distillation of the material may be compensated for by introducing a sufficient quantity of oxidizing gas into the liquid to oxidize a portion thereof and thus produce in situ the desired additional heat. This method of procedure may be distinguished from the previously described modifications, in that the oil or other liquid to be decomposed is heated to a high temperature, namely, that sufficient to effect cracking; in the other modifications such a temperature is not attained prior to reaching the reaction chamber and then the additional heat necessary to arrive at a temperature suitable to decomposition is supplied therein by the exothermic reaction of the oxidizing gas with the organic material.

The temperatures at which our process may be operated are subject to a wide variation and what may constitute an effective range for the decomposition and disintegration of one substance may not be entirely suited to a different starting material. However, it may be stated that a broad range of temperatures between 300° and 1000° F. is effective for most substances while for the disintegration and formation of products suitable for motor fuel a range of between 700° and 850° F. is preferred.

It is highly desirable to subject the reaction materials to substantial pressures during the operation of the process. By the application of high pressure the reactivity of the air is very greatly increased and complete deoxygenation thereof may be effected in its passage through the liquid material. Furthermore, under high pressure the oxygen becomes more concentrated and a smaller volume of gas will be required to promote the reaction than at lower pressures. Consequently, it may be desirable to employ pressures from 100 to 1000 pounds per square inch, but in the usual operation it is preferable to confine the pressure to a narrower range of 250 to 600 pounds per square inch. The application of pressure may also serve to prevent to a large extent at least, the premature volatilization of material undergoing treatment from the reaction zone, and it thus becomes effective to retain the heavier liquid constituents in the converting vessels until disintegration into lighter materials is effected.

The apparatus suited to the operation of our process may be similar in most respects to that commonly used to accomplish cracking by destructive distillation methods. It may comprise a converting vessel or still, preferably of the vertical type and provided with an air nozzle or distributor near the bottom for the introduction of compressed air, compressed air and steam, or other oxidizing gas.

Provision may be made for introducing the fresh oil, or liquid mixture, at a point preferably near the bottom of the vessel while the vapors generated may be taken off near the top and passed into the usual type of dephlegmator or bubble tower for the fractional removal of the heavier constituents. The vapors may pass from the bubble tower into a reflux condenser for further removal and fractionation of the vapor constituents and, if the fuel to be derived from the remaining vapors is to serve largely as motor fuel for internal combustion engines, this fractionation may be so conducted as to effect the removal of all heavier constituents of the vapors which may not be suitable for such fuel. Artificial cooling may be resorted to in the reflux condenser either by the circulation of cool oil, cool water or other agency therethrough. The condensate flowing to the base of the reflux condenser may be returned to the top of the bubble tower to serve as a cooling and fractionating medium therein. A heating coil or other apparatus may be provided for imparting the desired temperature to the fresh charge of the liquid material. Provision may also be made for withdrawing residual liquid from the bottom of the vessel.

Our invention contemplates, further, the use of several converting vessels in series preferably having means for intercommunication between them so that a common level of liquid material will prevail in the several vessels, while the vapors may be taken off in a common conduit and introduced into a single bubble tower. With this arrangement the fresh charge is preferably introduced into the first or into the first and second vessels and residual liquid or tar withdrawn from the last or the last and next to the last vessels.

An additional feature of the invention may consist in the cyclical return of the condensate of the heavier vapors collecting at the bottom of the bubble tower for further treatment, preferably to the first of the series of converting vessels where this material may undergo further decomposition into lighter material, although this liquid may be returned cyclically to pass through the heating coil with the fresh charge. In either event the return of condensate should be effected without reduction of the pressure obtaining in the system.

The accompanying drawing is a diagrammatic elevation partially in section of apparatus which may suitably be used in the operation of our process.

Referring to the drawing, the furnace 1 is provided with an oil or gas burner 2, and is adapted to heat the coil 3, which is of comparatively small cross-section and through which the liquid material may be passed to be preheated therein prior to entering the first converting vessel. The converting vessels 4, 5, 6 and 7 are arranged in series and provided with pipes 8, connecting the vapor spaces of the successive vessels. These vessels are also provided with pipes 9 to connect the vessels at a common liquid level. The coil 3 is connected to the vessels 4 and 5 by the pipe 10 and liquid may be directed into these vessels by the manipulation of suitable valves. The vessels may be provided with draw-off pipes at or near the bottom and controlled by suitable valves leading into the pipe 11. Insulation is preferably provided for the vessels and connecting parts, to avoid substantial heat losses and enable more effective operation.

From the last vessel 7 a vapor conduit or pipe 12 leads to a point near the bottom of the dephlegmator 13 which is provided with suitable plates or trays for the fractionation of the incoming vapors. Vapors leaving the top of the dephlegmator 13 pass through pipe 14 into a reflux condenser, shown diagrammatically at 15, in which cooling may be effected by the fresh liquid charge by passage through the coil 16. At the base of the dephlegmator 13 a second heat exchange coil 28 may be provided. The fresh charge may be raised to the desired pressure by pump 27 and is led by pipe 17 through coils 16 and 28 to the heating coil 3. Liquid condensed and flowing to the bottom of the reflux condenser 15 passes downwardly through the pipe 18 into the top of the dephlegmator 13. A pump 19 is provided for withdrawing the condensate from the bottom of the dephlegmator 13 and forcing the condensate through pipe 20 into the bottom of the converting vessel 4. However, by the manipulation of suitable valves the condensate may be forced through the pipe 35 to the coil 3 to derive additional heat.

A pipe 21 leads from the reflux condenser 15 to a water or brine cooled condenser shown diagrammatically at 22 and the condensate produced flows through pipe 23 into a receiver 24, while pipe 25 may lead to any suitable storage tank. Pipe 26 serves for the escape of uncondensed gases and may lead to any suitable container or apparatus for utilizing or purifying the same. Pipes 23 and 26 may be provided with suitable valves for the release of pressure obtaining in the system.

Each of the converting vessels 4, 5, 6 and 7 are provided with air distributors 30 by means of which compressed air or other suitable oxidizing gas may be introduced into the liquid preferably in a finely divided condition. The distributors 30 are connected by pipes 31 and 32 to a compressor 33. Pipes 31 may be provided with regulating valves suitable for controlling the amount of compressed air entering each vessel.

While the apparatus shown may be operated in several ways to produce various results, the course of operation in general may be as follows:

The fresh liquid material may pass from pump 27 through the pipe 17, coils 16 and 28 and into the coil 3 where it may be heated to any desired temperature. The charge then passes through the pipe 10 to either or both of converting vessels 4 and 5, while a common level of liquid will be maintained in all of the vessels because of the interconnections 9. Air may be introduced in any desired quantity into each vessel through the distributors 30 and such temperatures created as to effect active decomposition of the contents. The vapors and gases generated pass through the interconnecting pipes 8 and finally through the pipe 12 into the dephlegmator 13 in which by fractionation the heavier constituents of the vapors are condensed, and are preferably continuously returned by means of pump 19 through the pipe 20 to the first converting vessel 4. The vapors uncondensed in the dephlegmator 13 pass into the reflux condenser 15 and are there subjected to a further fractionation, the liquid condensed being returned to the top of the dephlegmator 13 to serve as a fractionating medium therein. Cooling may be effected in the reflux condenser 15 by the passage of the fresh charge through the coil 16. Vapors escaping from the top of the reflux condenser are passed to the watercooled condenser 22 for the condensation of the desired liquid product. By the operation of suitable valves in pipe 17 the fresh charge may be partially or wholly diverted from passage through the coils 16 and 28.

It is desirable to maintain a substantially constant liquid level in the converting vessels, in order to have uniform operating conditions, and for this reason residual liquid may be withdrawn preferably continuously to accomplish this end.

As heretofore outlined, the fresh charge, or the condensate from the dephlegmator, or both, may be preheated to any desired degree prior to being introduced into the converting vessels. Temperatures suitable to active decomposition are maintained in the vessels by the introduction of air. It is obvious from such methods of operation that no external heating need be applied to the vessels, thus eliminating a frequent source of fires. This is not altered by the fact that the fresh charge or the condensate from the dephlegmator may be preheated even to a cracking temperature, for such heating may take place in a furnace apart and removed from the vicinity of the converting vessels. It may even be desirable to eliminate fires altogether, once the process is started, and use merely whatever heat may be available by heat exchange from the generated vapors. By this latter method of operation fire risks may be practically eliminated from that part of the refinery.

In this modification the oil is preferably heated to a temperature of about 700° F. or less in the heating coil while the usual cracking temperatures of about 750° F. or over are maintained in the converting vessels. The preferred pressure, as previously indicated, may be from 250 to 600 pounds per square inch.

While we have thus described and illustrated our invention, various modifications thereof will be suggested to those skilled in the art, and we therefore desire to be limited only as indicated in the appended claims.

What we claim is:

1. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, introducing a free oxygen containing gas into the body of the liquid, preventing loss of heat from the vessel to maintain temperature of about 750° F. or higher therein, removing the generated vapors and condensing therefrom the less volatile constituents, returning the hot condensate without further heating to the vessel to undergo further decomposition, and withdrawing residual liquid from the bottom of the vessel.

2. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, to form a considerable depth of liquid therein, introducing a free oxygen containing gas at such point in the liquid as to effect substantially complete deoxygenation of the gas, preventing loss of heat from the vessel to maintain temperatures of about 750° F. or higher therein, removing the generated vapors and condensing therefrom the less volatile constituents, returning the hot condensate without further heating to the vessel to undergo further decomposition, and withdrawing residual liquid from the bottom of the vessel.

3. The process of decomposing hydrocarbon materials in a substantially liquid state, which comprises heating a flowing stream of the liquid to a temperature of about 300 to 700° F., passing the heated liquid into the first of a series of interconnected converting vessels, under substantial super-atmospheric pressure, to form a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, removing the generated vapors and condensing therefrom the less volatile constituents, returning the condensate to the first vessel to undergo further decomposition, and withdrawing residual liquid from the bottom of the last vessel.

4. The process of decomposing hydrocarbon materials in a substantially liquid state, which comprises heating a flowing stream of the liquid to a temperature of about 300 to 700° F., continuously passing the heated liquid into the first of a series of interconnected converting vessels under substantial super-atmospheric pressure, to form a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to the first vessel to undergo further decomposition, and withdrawing residual liquid from the bottom of the last vessel.

5. The process of decomposing hydrocarbon materials in a substantially liquid state, which comprises heating a flowing stream of the liquid, continuously passing the heated liquid into the first of a series of interconnected converting vessels under substantial super-atmospheric pressure, to form a considerable depth of liquid therein, effecting a flow of the liquid from the first to the succeeding vessels, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to the first vessel to undergo further decomposition, and withdrawing residual liquid from the bottom of the last vessel.

6. The process of decomposing hydrocarbon materials in a substantially liquid state, which comprises heating a flowing stream of the liquid to a temperature of about 300 to 700° F., continuously passing the heated liquid into the first of a series of interconnected converting vessels under substantial super-atmospheric pressure, to form a considerable depth of liquid therein, supplying enough additional heat to each vessel to raise the temperature to about 750° F. or higher through means of the exothermic reaction of a free oxygen containing gas with the hydrocarbon material, removing the generated vapors and condensing therefrom the less volatile constituents, continuously returning the condensate to the first vessel to undergo further decomposition, and withdrawing residual liquid from the bottom of the last vessel.

7. The process of decomposing hydrocarbon materials in a substantially liquid state, which comprises heating a flowing stream of liquid to a temperature of about 300 to 700° F., continuously passing the heated liquid into the first of a series of interconnected heat insulated converting vessels under substantial super-atmospheric pressure, introducing a free oxygen containing gas into each vessel to react exothermically with the hydrocarbon material therein, whereby enough additional heat is supplied to each vessel to raise the temperature to about 750° F. or higher, removing the generated vapors and condensing therefrom the less volatile constituents, and cyclically returning the condensate while still under pressure for further treatment.

8. The process of decomposing hydrocarbon materials in a substantially liquid state, which comprises heating a flowing stream of the liquid charge, passing it into a converting vessel maintained under substantial super-atmospheric pressure, introducing a free oxygen containing gas into the vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the mass in the vessel at 750° F. or higher, removing the generated vapors and condensing therefrom the less volatile constituents, returning the hot condensate to the vessel without further heating to undergo further decomposition therein, and withdrawing residual liquid from the bottom of the vessel.

9. The process of decomposing hydrocarbon materials in a substantially liquid state, which comprises heating a flowing stream of the liquid charge, passing it into the first of a series of interconnected converting vessels maintained under substantial superatmospheric pressure, introducing a free oxygen containing gas into each vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the material in the vessels at 750° F. or higher, removing the generated vapors and condensing therefrom the less volatile constituents, returning the hot condensate to the first vessel without further heating to undergo further decomposition therein, and withdrawing residual liquid from the bottom of the vessels.

10. The process of decomposing hydrocarbon materials in a substantially liquid state, which comprises heating a flowing stream of the liquid charge, passing it into the first of a series of interconnected converting vessels maintained under substantial superatmospheric pressure, introducing a free oxygen containing gas into each vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the material in the vessels at 750° F. or higher, removing the generated vapors and condensing therefrom constituents less volatile than motor fuel, returning the hot condensate to the first vessel without further heating to undergo further decomposition therein, and withdrawing residual liquid from the bottom of the vessels.

In witness whereof we have hereunto set our hands this 19th day of April, 1926.

R. J. DEARBORN.
GEORGE W. GRAY.

DISCLAIMER 1,861,956.—*Richard J. Dearborn*, Summit, N. J., and *George W. Gray*, New York, N. Y. PROCESS FOR DECOMPOSING ORGANIC MATERIALS. Patent dated June 7, 1932. Disclaimer filed July 22, 1933, by the assignee, *The Texas Company*.

Hereby disclaims from claims 1 to 7, inclusive, of said Letters Patent all processes except those in which the generated vapors are removed from the converting vessels and are then fractionated between motor fuel as a vapor fraction and less volatile constituents as condensate.

[*Official Gazette August 15, 1933.*]

DISCLAIMER 1,861,956.—*Richard J. Dearborn*, Summit, N. J., and *George W. Gray*, New York, N. Y. PROCESS FOR DECOMPOSING ORGANIC MATERIALS. Patent dated June 7, 1932. Disclaimer filed April 4, 1935, by the assignee, *The Texas Company*.

Hereby enters this disclaimer to claims 1, 2, and 8 of said Letters Patent.
[*Official Gazette April 23, 1935.*]